US010052604B2

(12) United States Patent
Sreethawong et al.

(10) Patent No.: US 10,052,604 B2
(45) Date of Patent: Aug. 21, 2018

(54) SILICA COATING ON NANOPARTICLES

(71) Applicant: Agency for Science, Technology and Research, Singapore (SG)

(72) Inventors: Thammanoon Sreethawong, Singapore (SG); Kwok Wei Shah, Singapore (SG); Shuhua Liu, Singapore (SG); Shuang-Yuan Zhang, Singapore (SG); Suo Hon Lim, Singapore (SG); Kian Seng Ang, Singapore (SG); Li Sirh Tan, Singapore (SG); Ming-Yong Han, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 15/327,577

(22) PCT Filed: Jul. 21, 2015

(86) PCT No.: PCT/SG2015/050222
§ 371 (c)(1),
(2) Date: Jan. 19, 2017

(87) PCT Pub. No.: WO2016/013975
PCT Pub. Date: Jan. 28, 2016

(65) Prior Publication Data
US 2017/0173550 A1    Jun. 22, 2017

(30) Foreign Application Priority Data
Jul. 21, 2014  (SG) .............................. 10201404279P

(51) Int. Cl.
*B82B 3/00* (2006.01)
*B01J 13/18* (2006.01)
*C01B 33/12* (2006.01)
*B82Y 40/00* (2011.01)

(52) U.S. Cl.
CPC ............. *B01J 13/18* (2013.01); *B82B 3/0042* (2013.01); *C01B 33/12* (2013.01); *B82Y 40/00* (2013.01); *C01P 2004/04* (2013.01); *C01P 2004/64* (2013.01); *C01P 2004/84* (2013.01)

(58) Field of Classification Search
CPC .............................. B82B 3/0042; B82Y 40/00
See application file for complete search history.

(56) References Cited

U.S. PATENT DOCUMENTS
2011/0027832 A1    2/2011  Kermekchiev et al.

FOREIGN PATENT DOCUMENTS
CN      103736433 A      4/2014

OTHER PUBLICATIONS

Cui, Y. et al., Au@organosilica multifunctional nanoparticles for the multimodal imaging, Chem. Sci., 2:1463-1469 (2011).
(Continued)

*Primary Examiner* — Carlos A Azpuru
(74) *Attorney, Agent, or Firm* — Choate, Hall & Stewart LLP

(57) ABSTRACT

This invention relates to a method for synthesizing a SiO2-coated nanoparticle, the method comprising the step of reacting a hydroxyl-functionalized silane with a nanoparticle in a substantially aqueous phase under conditions to induce silanization of the nanoparticle. The method enables silanization of the nanoparticle in aqueous phase that is substantially free of organic solvents.

20 Claims, 9 Drawing Sheets

(56) References Cited

OTHER PUBLICATIONS

International Search Report for PCT/SG2015/050222, 4 pages (dated Aug. 17, 2015).
Nakagawa, K. et al., Sintering Resistance and Catalytic Activity of Platinum Nanoparticles Covered with a Microporous Silica Layer Using Methyltriethoxysilane, Catal. Letter, 136:71-76 (2010).
Sakai, T. et al., Direct Fabrication of Silica-Coated Gold Nanoparticles and Gold Nanoparticle-Deposited Silica Spcheres in Aqueous Media, J. Jpn. Soc. Colour. Mater., 82(9):387-396 (2009).
Shah, K. et al., Aqueous route to facile, efficient and functional silica coating of metal nanoparticles at room temperature, Nanoscale, 6:11273-11281 (2014).
Written Opinion for PCT/SG2015/050222, 6 pages (dated Aug. 17, 2015).

[Fig. 1]
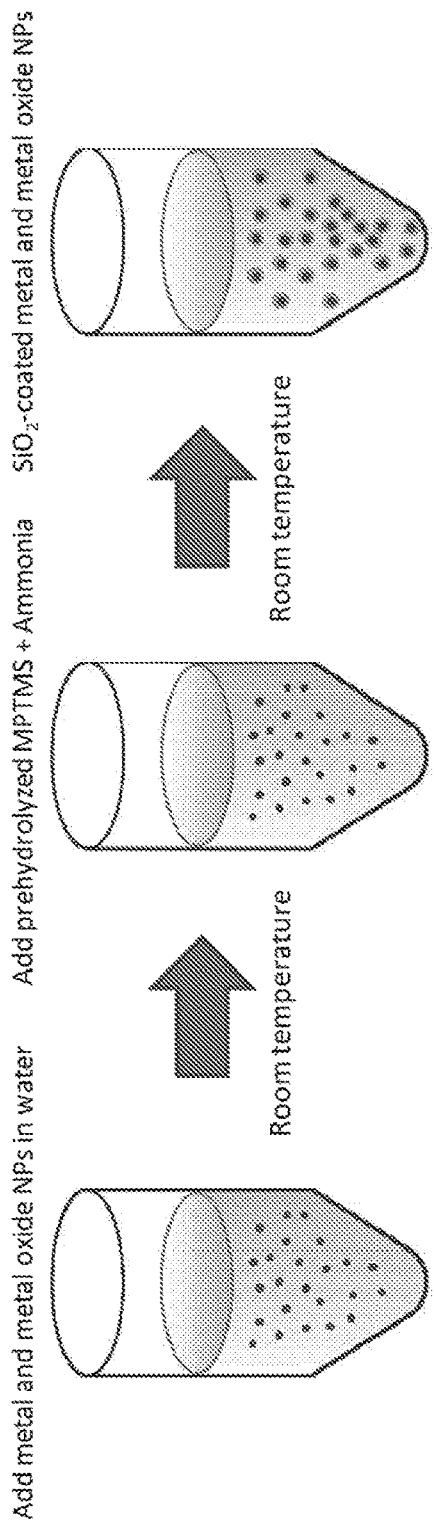

[Fig. 2]
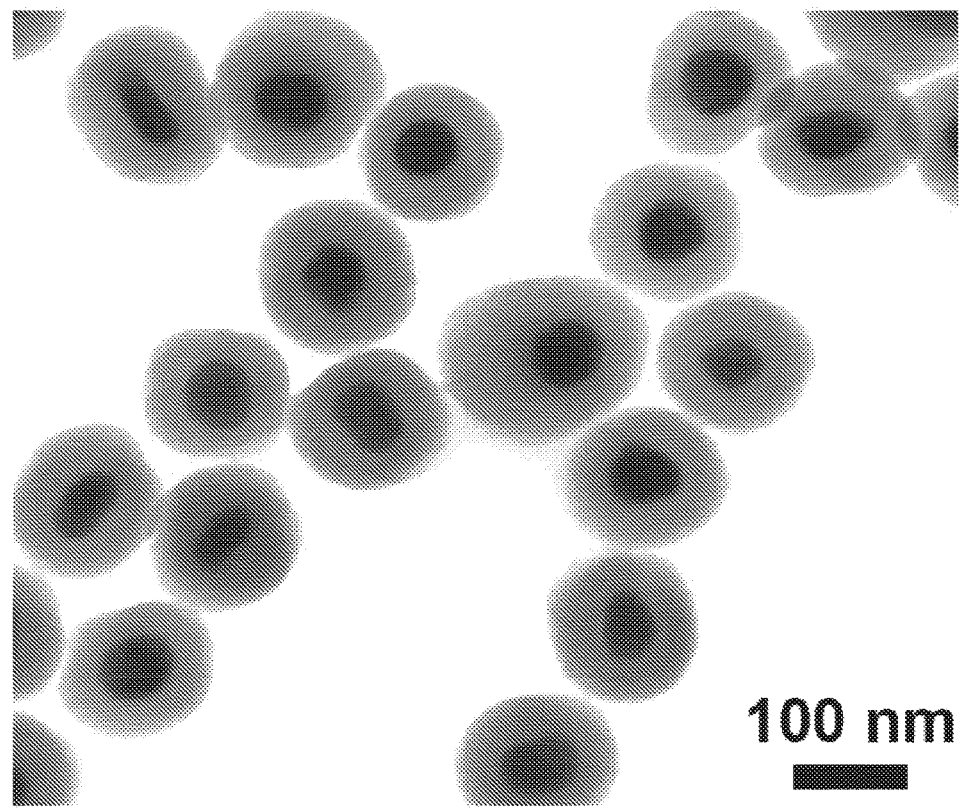

[Fig. 3]
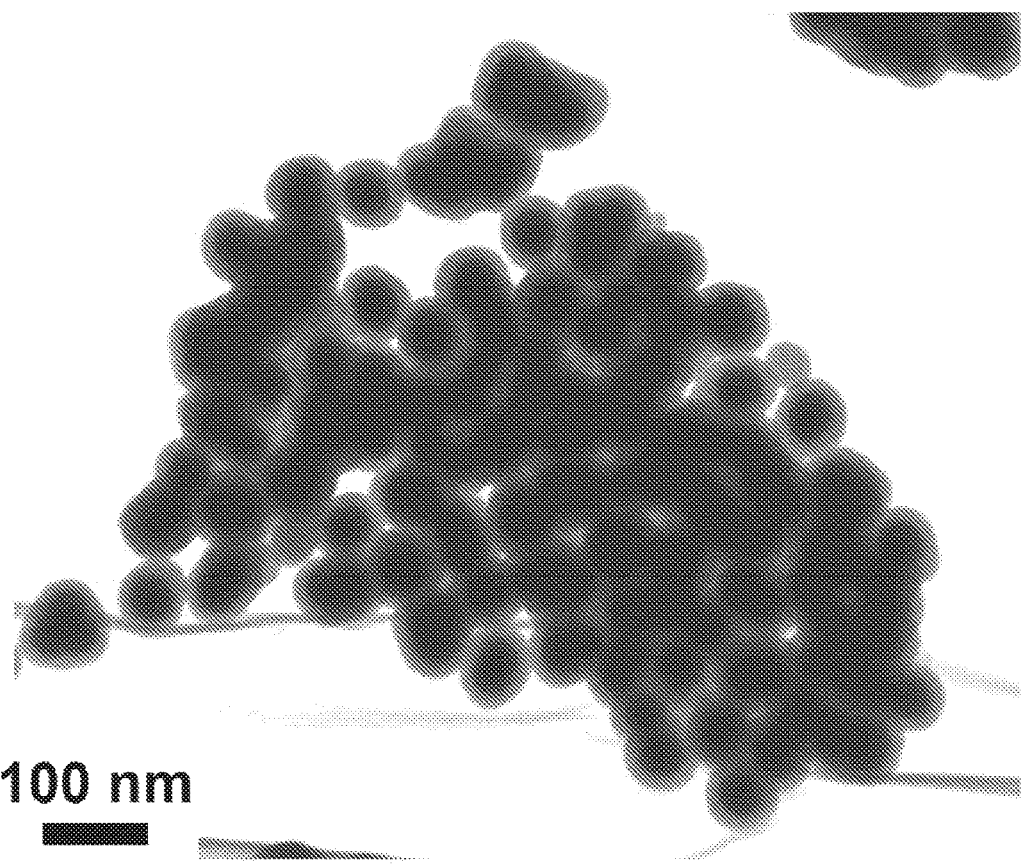

[Fig. 4]
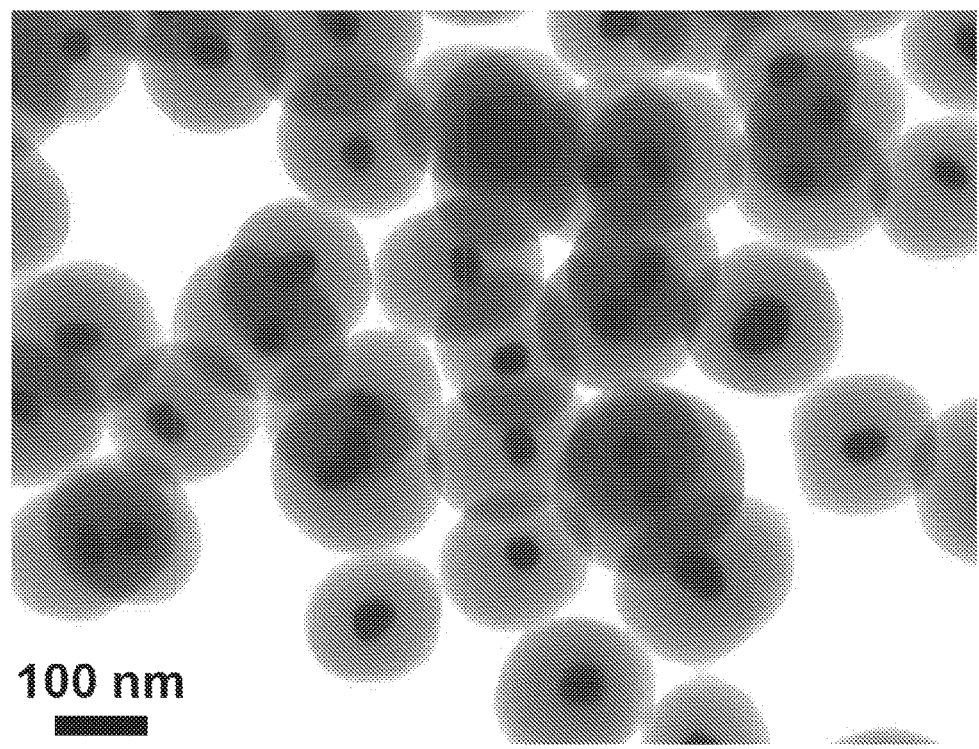

[Fig. 5]
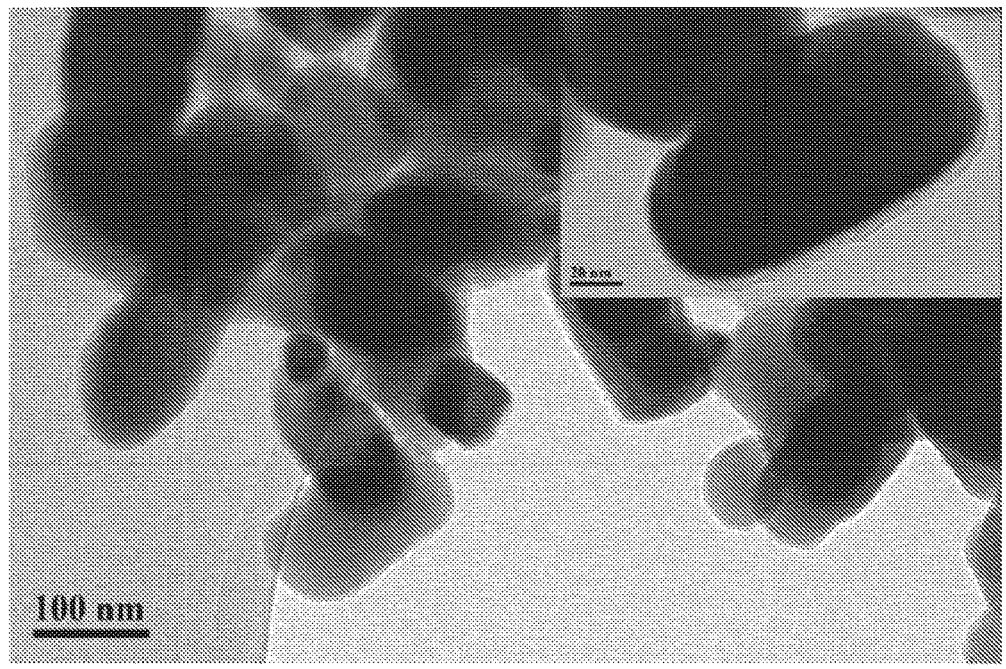
[Fig. 6]
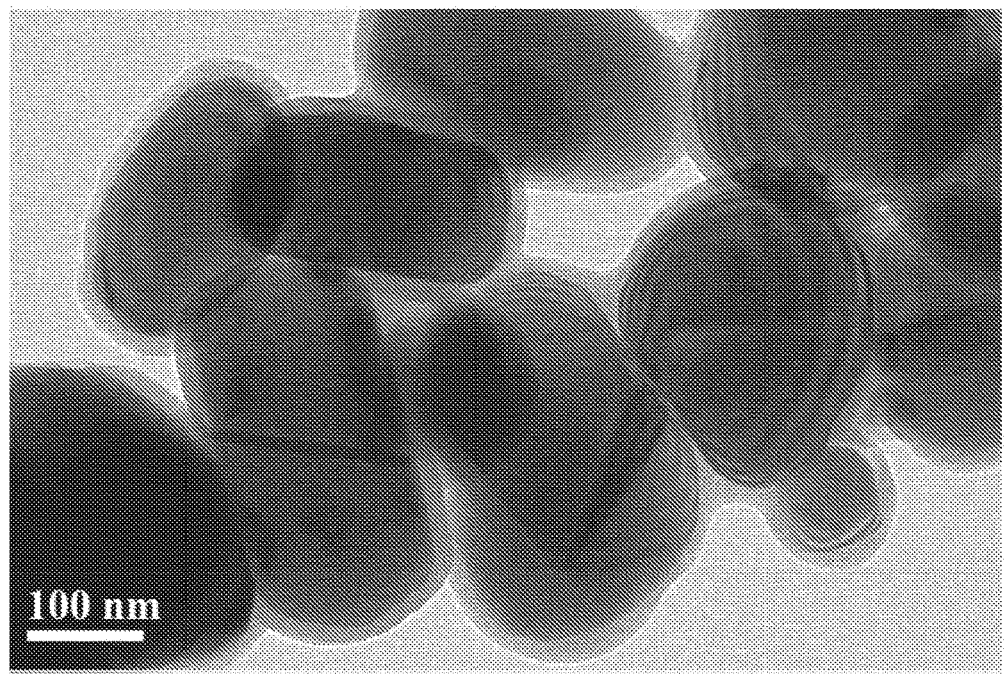

[Fig. 7]
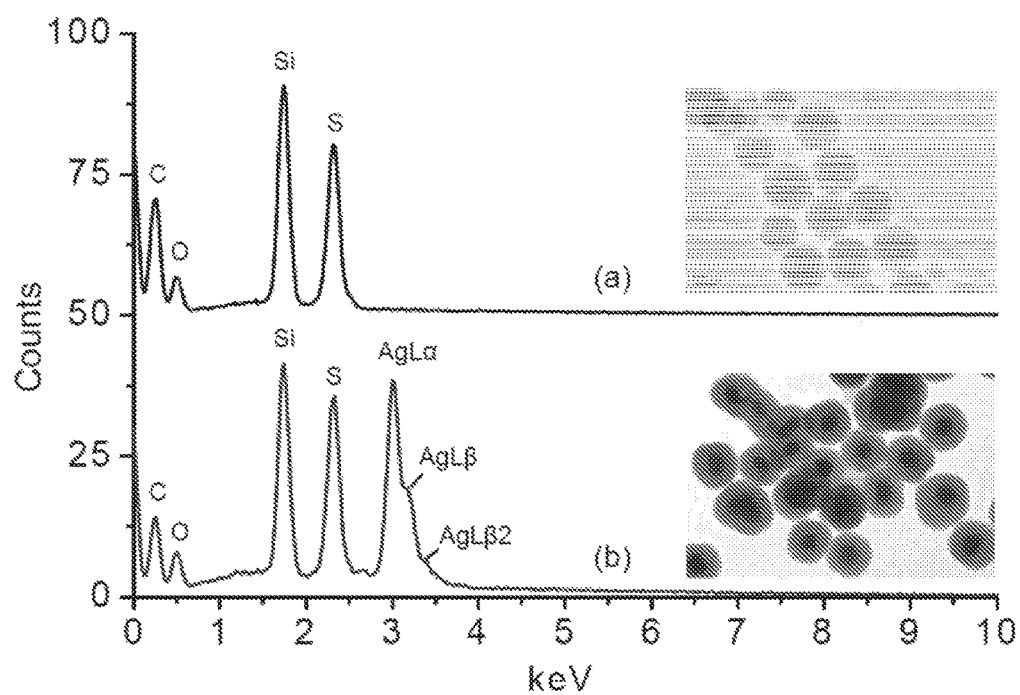

[Fig. 8]
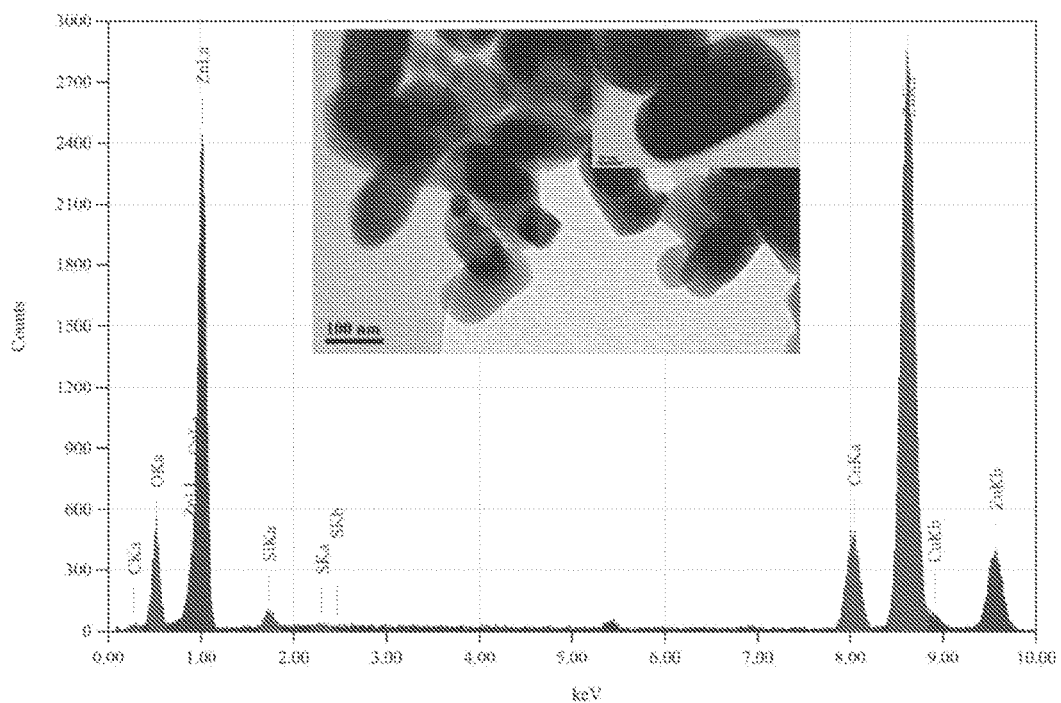

[Fig. 9]
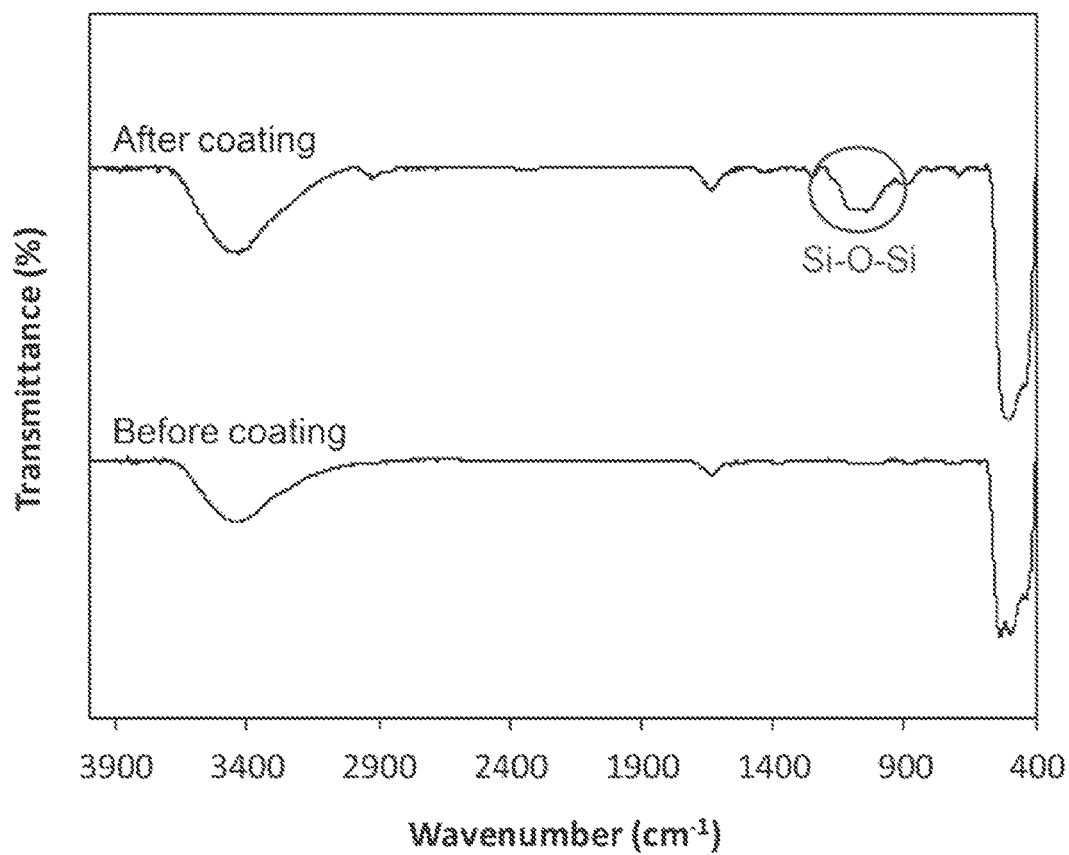

[Fig. 10]
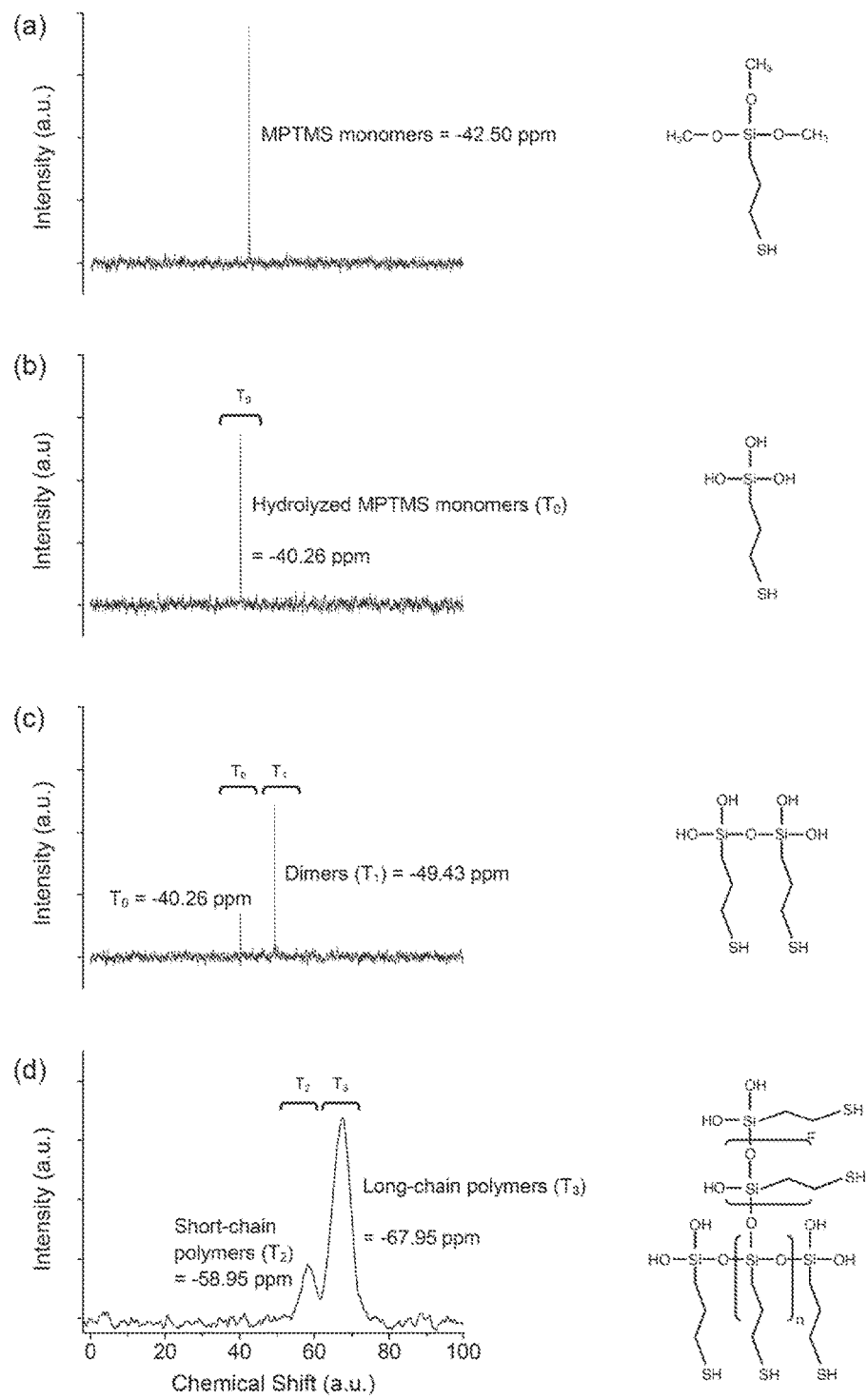

SILICA COATING ON NANOPARTICLES

This patent application is a National Stage Entry of International Patent Application No. PCT/SG2015/050222, filed on Jul. 21, 2015, which claims the benefit of priority of Singapore patent application No. 10201404279P, filed on Jul. 21, 2014, the contents of each of which are hereby incorporated by reference in their entirety for all purposes herein.

TECHNICAL FIELD

The present invention relates to a method for coating metal nanoparticles and metal oxide nanoparticles with $SiO_2$.

BACKGROUND ART

Silica ($SiO_2$) coating on metal nanoparticles (NPs) and metal oxide NPs is a promising approach for many value-added applications, such as glass coatings, paints, water and air purification, antibacterials, diagnostics, sensors and cosmetics. $SiO_2$-coated metal NPs and metal oxide NPs have unique features of photocatalytic activity that enables self-cleaning of the surface, as well as water and air treatment, due to the ability of the $SiO_2$-coated metal NPs and metal oxide NPs to remove low levels of organic pollutants. The value-added $SiO_2$-coated metal NPs and metal oxide NPs take advantage of the coated $SiO_2$ layer as it greatly enhances the dispersibility and stability of the metal NPs and metal oxide NPs in various media. This is extremely important for practical uses, not only for those mentioned above but also for building and construction applications, particularly in tropical countries where solar energy is abundant.

There are several approaches for preparing $SiO_2$-coated metal NPs and metal oxide NPs. One example is the Stöber method, which involves the base-catalyzed hydrolysis of a silane precursor such as tetraethyl orthosilicate (TEOS) followed by the formation of $SiO_2$ on the surface of metal NPs and metal oxide NPs. Although this method is very useful, the rate of production of the $SiO_2$-coated metal NPs and metal oxide NPs using this method is very slow due to the inertness of the TEOS, leading to difficulty in large-scale production.

Further, conventional production of $SiO_2$-coated metal NPs and metal oxide NPs requires the use of at least one organic solvent. For example, in the Stöber method, ethanol is used. The organic solvent usually comprises greater than 80% of the solvent mixture. This is because the silane precursors used in conventional methods are not soluble in water. As such, addition of organic solvent such as ethanol is necessary to ensure that the silane precursor dissolves in the reaction mixture. However, the requirement to add an organic solvent to the reaction mixture leads to additional steps in the preparation and purification of the NPs. Further, the use of organic solvents makes the process less environmentally friendly.

Further, conventional approaches often also require the treatment of the surface of the metal or metal oxide NP by surface-stabilizing agents or surface-modifying agents prior to $SiO_2$ coating. That is, the $SiO_2$ is coated on the surface indirectly. This leads to multiple steps being involved in the preparation, resulting in a complicated synthetic procedure.

Another approach for synthesizing $SiO_2$-coated metal NPs and metal oxide NPs may be to use reverse microemulsion, whereby surfactants are used for making the water-in-oil emulsion. However, this leads to additional purification steps to remove the surfactant.

The use of organic solvents, surface-stabilizing agents, surface-modifying agents and surfactants makes these approaches inefficient, time-consuming, environmentally unfriendly, very costly, and unsuitable for large-scale production.

There is therefore a need to provide a method for preparing $SiO_2$-coated metal NPs and metal oxide NPs that overcomes or at least ameliorates, one or more of the disadvantages described above.

SUMMARY OF INVENTION

According to a first aspect, there is provided a method for synthesizing a $SiO_2$-coated nanoparticle, the method comprising the step of reacting a hydroxyl-functionalised silane with a nanoparticle in a substantially aqueous phase under conditions to induce silanization of the nanoparticle.

Advantageously, the method enables a very simple, effective and low-cost aqueous approach for coating of $SiO_2$ on metal NPs and metal oxide NPs. The method may be carried out at room temperature, eliminating the need to elevate the reaction temperature for the reaction to proceed. Further, the reaction may be performed in the absence of organic solvents, making the reaction more environmentally friendly and more cost effective. Further advantageously, since an organic solvent is not required, the step of removing the organic solvent may be eliminated, and therefore there may be less steps involved in the synthetic procedure, making the method more time efficient as well.

Further advantageously, the method may be carried out in a substantially aqueous phase, making the method environmentally friendly and more cost effective. More advantageously, the method may be carried out in substantially water. The substantially water may comprise substantially no organic solvents and substantially no dissolved solids. Further advantageously, since substantially water may comprise substantially no organic solvents, the step of removing the organic solvent may be eliminated. Further advantageously, since substantially water may comprise substantially no dissolved solids, the step of removing the dissolved solids may be eliminated. Advantageously, the substantially water may facilitate the reaction to be performed in a simpler, more environmentally friendly and cost-effective manner.

More advantageously, surface stabilizing agents or surface modifying agents may not be required in the method, further reducing the number of steps involved in the synthetic procedure by eliminating the steps required for removing such agents. In addition, since surface stabilizing agents or surface modifying agents may not be required, direct $SiO_2$-coating on the surface of the nanoparticle may be achieved by the method, unlike conventional methods which require indirect coating of $SiO_2$ on the surface by using agents such as the surface stabilizing agent and surface modifying agent. Taken together, these advantages may also make the method more time efficient and cost effective.

Further advantageously, the reaction may be performed in a single pot, eliminating the need to move reaction mixtures from one container to another. This may also lead to improved time- and cost-effectiveness of the method.

More advantageously, the reaction may proceed quickly compared to conventional processes, making the method even more time efficient. Due to the mild reaction conditions, simple nature of the reaction and fast reaction time, the method may be suitable for large scale production of the SiO$_2$-coated metal NPs or metal oxide NPs due to the ease of being able to scale the reaction up.

In an embodiment, 3-(mercaptopropyl)trimethyoxysilane (MPTMS) may be the silane precursor. Advantageously, MPTMS may be hydrolysed in neutral water. Further advantageously, MPTMS, after hydrolysis, may be soluble in water and have high reactivity for SiO$_2$ formation. This may enable the reaction to be carried out in a substantially aqueous phase, and for the reaction to proceed quickly. Further advantageously, the MPTMS is used in direct silica-coating of metal and metal oxide nanoparticles in a substantially aqueous phase. Conventionally, MPTMS has not been recognized or tapped as a silane precursor for direct silica-coating of metal and metal oxide nanoparticles in aqueous phase. Advantageously, MPTMS may be able to achieve the SiO$_2$-coating of metal and metal oxide nanoparticles more efficiently than other silane precursors.

Definitions

The following words and terms used herein shall have the meaning indicated:

The term "silane precursor" refers to silane compounds that may be chemically converted to an activated silane.

The term "hydroxyl-functionalised silane" refers to a silane precursor that has been chemically converted to confer improved solubility and reactivity to the silane group. The hydroxyl-functionalised silane groups contain silanol (Si—OH) groups which cross-links to form siloxane bonds (Si—O—Si) to produce dimers, oligomers and denser networks.

For the purposes of this disclosure, the term "Ag@SiO$_2$" means "SiO$_2$ coated Ag NPs" or SiO$_2$-encapsulated AgNPs. Similarly, the term "Pt@ SiO$_2$" means "SiO$_2$ coated Pt NPs" or SiO$_2$-encapsulated PtNPs.

In the definitions of a number of substituents below it is stated that "the group may be a terminal group or a bridging group". This is intended to signify that the use of the term is intended to encompass the situation where the group is a linker between two other portions of the molecule as well as where it is a terminal moiety. Using the term alkyl as an example, some publications would use the term "alkylene" for a bridging group and hence in these other publications there is a distinction between the terms "alkyl" (terminal group) and "alkylene" (bridging group). In the present application no such distinction is made and most groups may be either a bridging group or a terminal group.

"Acyl" means an R—C(=O)— group in which the R group may be an optionally substituted alkyl, optionally substituted cycloalkyl, optionally substituted heterocycloalkyl, optionally substituted aryl or optionally substituted heteroaryl group as defined herein. Examples of acyl include acetyl, benzoyl and amino acid derived aminoacyl. The group may be a terminal group or a bridging group. If the group is a terminal group it is bonded to the remainder of the molecule through the carbonyl carbon.

"Alkyl" as a group or part of a group refers to a straight or branched aliphatic hydrocarbon group, preferably a $C_1$-$C_{12}$ alkyl, more preferably a $C_1$-$C_{10}$ alkyl, most preferably $C_1$-$C_6$ unless otherwise noted. Examples of suitable straight and branched $C_1$-$C_6$ alkyl substituents include methyl, ethyl, n-propyl, 2-propyl, n-butyl, sec-butyl, t-butyl, hexyl, and the like. The group may be a terminal group or a bridging group.

"Alkenyl" as a group or part of a group denotes an aliphatic hydrocarbon group containing at least one carbon-carbon double bond and which may be straight or branched preferably having 2-12 carbon atoms, more preferably 2-10 carbon atoms, most preferably 2-6 carbon atoms, in the normal chain. The group may contain a plurality of double bonds in the normal chain and the orientation about each is independently E or Z. Exemplary alkenyl groups include, but are not limited to, ethenyl, propenyl, butenyl, pentenyl, hexenyl, heptenyl, octenyl and nonenyl. The group may be a terminal group or a bridging group.

"Alkynyl" as a group or part of a group means an aliphatic hydrocarbon group containing a carbon-carbon triple bond and which may be straight or branched preferably having from 2-12 carbon atoms, more preferably 2-10 carbon atoms, more preferably 2-6 carbon atoms in the normal chain. Exemplary structures include, but are not limited to, ethynyl and propynyl. The group may be a terminal group or a bridging group.

"Alkyloxy" refers to an alkyl-O— group in which alkyl is as defined herein. Preferably the alkyloxy is a $C_1$-$C_6$alkyloxy. Examples include, but are not limited to, methoxy and ethoxy. The group may be a terminal group or a bridging group. The term alkyloxy may be used interchangeably with the term "alkoxy".

"Alkenyloxy" refers to an alkenyl-O— group in which alkenyl is as defined herein. Preferred alkenyloxy groups are $C_1$-$C_6$ alkenyloxy groups. The group may be a terminal group or a bridging group. If the group is a terminal group it is bonded to the remainder of the molecule through the oxygen atom.

"Alkynyloxy" refers to an alkynyl-O— group in which alkynyl is as defined herein. Preferred alkynyloxy groups are $C_1$-$C_6$ alkynyloxy groups. The group may be a terminal group or a bridging group. If the group is a terminal group it is bonded to the remainder of the molecule through the oxygen atom.

"Amino" refers to groups of the form —NR$_a$R$_b$ wherein R$_a$ and R$_b$ are individually selected from the group including but not limited to hydrogen, optionally substituted alkyl, optionally substituted alkenyl, optionally substituted alkynyl, and optionally substituted aryl groups.

"Halogen" represents chlorine, fluorine, bromine or iodine. The term "optionally substituted" as used herein means the group to which this term refers may be unsubstituted, or may be substituted with one or more groups independently selected from alkyl, alkenyl, alkynyl, thioalkyl, cycloalkyl, cycloalkylalkyl, cycloalkenyl, cycloalkylalkenyl, heterocycloalkyl, cycloalkylheteroalkyl, cycloalkyloxy, cycloalkenyloxy, cycloamino, halo, carboxyl, haloalkyl, haloalkynyl, alkynyloxy, heteroalkyl, heteroalkyloxy, hydroxyl, hydroxyalkyl, alkoxy, thioalkoxy, alkenyloxy, haloalkoxy, haloalkenyl, haloalkynyl, haloalkenyloxy, nitro, amino, nitroalkyl, nitroalkenyl, nitroalkynyl, nitroheterocyclyl, alkylamino, dialkylamino, alkenylamine, aminoalkyl, alkynylamino, acyl, alkyloxy, alkyloxyalkyl, alkyloxyaryl, alkyloxycarbonyl, alkyloxycycloalkyl, alkyloxyheteroaryl, alkyloxyheterocycloalkyl, alkenoyl, alkynoyl, acylamino, diacylamino, acyloxy, alkylsulfonyloxy, heterocyclic, heterocycloalkenyl, heterocycloalkyl, heterocycloalkylalkyl, heterocycloalkylalkenyl, heterocycloalkylheteroalkyl, heterocycloalkyloxy, heterocycloalkenyloxy, heterocycloxy, heterocycloamino, haloheterocycloalkyl, alkylsulfinyl, alkylsulfonyl, alkylsulfenyl, alkylcarbonyloxy, alkylthio, acylthio, aminosulfonyl, phosphorus-containing groups such as phosphono and phosphinyl, sulfinyl, sulfinylamino, sulfonyl, sulfonylamino, aryl, heteroaryl, heteroarylalkyl, heteroarylalkenyl, heteroarylheteroalkyl, heteroarylamino, heteroaryloxy, arylalkenyl, arylalkyl, alkylaryl, alkylheteroaryl, aryloxy, arylsulfonyl, cyano, cyanate, isocyanate, —C(O)NH(alkyl), and —C(O)N(alkyl)$_2$.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and subgeneric groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF OPTIONAL EMBODIMENTS

Exemplary, non-limiting embodiments of a polymer matrix will now be disclosed.

There is provided a method for synthesizing a SiO$_2$-coated nanoparticle, the method comprising the step of reacting a hydroxyl-functionalised silane with a nanoparticle in a substantially aqueous phase under conditions to induce silanization of the nanoparticle.

The substantially aqueous phase may be substantially water or a substantially aqueous solution. The substantially aqueous solution may be a buffer. The substantially aqueous phase may comprise substantially no organic solvent. The substantially aqueous phase may be substantially free of organic solvent. The substantially aqueous phase may be water.

For the purposes of this disclosure, substantially no organic solvent may mean that the substantially aqueous phase comprises less than about 5 v/v % organic solvent, less than about 4 v/v % organic solvent, less than about 3 v/v % organic solvent, less than about 2 v/v % organic solvent, less than about 1 v/v % organic solvent, less than about 0.5 v/v % organic solvent, less than about 0.1 v/v % organic solvent, less than 0.05 v/v % organic solvent or less than about 0.01 v/v % organic solvent. Substantially water may contain substantially no organic solvent.

For the purposes of this disclosure, substantially water may mean that the substantially water comprises less than about 2000 ppm of total dissolved solid, less than about 1500 ppm of total dissolved solid, less than about 1000 ppm of total dissolved solid or less than about 500 ppm of total dissolved solid. For the purposes of this disclosure, the substantially aqueous phase may be substantially water at the beginning of the reaction. That is, the substantially aqueous phase may be substantially water when time=0.

The method according to claim 3, wherein the hydroxyl-functionalised silane has the following formula (I):

[Math. 1]

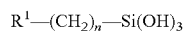  Formula (I)

$$R^1-(CH_2)_n-Si(OH)_3 \quad \text{Formula (I)}$$

wherein
R$^1$ is selected from the group consisting of amino, glycidyl, mercapto and any mixture thereof; and
n is an integer from 1 to 10.
R$^1$ may be mercapto.
n may be 1, 2, 3, 4, 5, 6, 7, 8, 9 or 10. n may be 3.

The hydroxyl-functionalised silane may be formed by the hydrolysis of a silane precursor. The hydrolysis of the silane precursor may be a reaction involving the breaking of a bond in the silane precursor using water.

The hydroxyl-functionalised silane may be selected to be soluble in an aqueous phase. Accordingly, the method may be carried out in an aqueous phase.

There is provided a method for synthesizing a SiO$_2$-coated nanoparticle, the method comprising the step of reacting a hydroxyl-functionalised silane with a nanoparticle in a substantially aqueous phase under conditions to induce silanization of the nanoparticle, wherein the hydroxyl-functionalised silane is selected to be soluble in the substantially aqueous phase.

The hydrolysis may be performed by mixing the silane precursor with substantially water to form the hydroxyl-functionalised silane.

The silane precursor may have the following formula (II):

[Math. 2]

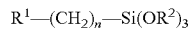 Formula (II)

$$R^1-(CH_2)_n-Si(OR^2)_3 \quad \text{Formula (II)}$$

wherein
R$^1$ may be selected from the group consisting of amino, glycidyl, mercapto and any mixture thereof;
R$^2$ may be an optionally substituted alkyl group; and
n may be an integer from 0 to 10.
R$^1$ may be mercapto.
R$^2$ may be methyl, ethyl, n-propyl, 1-propyl, 2-propyl, n-butyl, 1-butyl, 2-butyl, sec-butyl, iso-butyl, tert-butyl, n-pentyl, 1-pentyl, 2-pentyl, 3-pentyl, 3-methyl-1-butyl, 2-methyl-1-butyl, 2,2-dimethyl-1-propyl, 3-methyl-2-butyl, 2-methyl-2-butyl, n-hexyl, 1-hexyl, 2-hexyl, 3-hexyl, n-heptyl, 1-heptyl, 2-heptyl, 3-heptyl, 4-heptyl, n-octyl, 1-octyl, 2-octyl, 3-octyl, 4-octyl, n-nonyl, 1-nonyl, 2-nonyl, 3-nonyl, 4-nonyl, 5-nonyl, n-decyl, 1-decyl, 2-decyl, 3-decyl, 4-decyl or 5-decyl. R$^2$ may be methyl. R$^2$ may be optionally substituted with an alkyl, alkenyl, akynyl, alkyloxy, alkenyloxy, alkynyloxy, halo, acyl, amino, nitro, or cyano.
n may be 1, 2, 3, 4, 5, 6, 7, 8, 9 or 10. n may be 3.

The silane precursor may be (3-mercaptopropyl)trimethoxysilane, (3-mercaptopropyl)triethoxysilane, (3-mercaptopropyl)tripropyloxysilane. (3-mercaptopropyl)

tributoxysilane, (3-mercaptopropyl)trihexoxysilane, (3-mercaptopropyl)triheptoxysilane, mercaptopropyl)trioctoxysilane, mercaptopropyl)trinonoxysilane or. mercaptopropyl)tridecoxysilane.

The silane precursor may be (3-mercaptomethyl)trimethoxysilane, (3-mercaptoethyl)trimethoxysilane, (3-mercaptopropyl)trimethoxysilane, (3-mercaptonbutyl)trimethoxysilane, (3-mercaptonpentyl)trimethoxysilane, (3-mercaptonhexyl)trimethoxysilane, (3-mercaptonheptyl)trimethoxysilane, (3-mercaptonoctyl)trimethoxysilane, (3-mercaptononyl)trimethoxysilane, (3-mercaptodecyl)trimethoxysilane.

The nanoparticle may be a metal nanoparticle or a metal oxide nanoparticle.

The metal may be a transition metal. The metal may be selected from the group consisting of group 4 metal, group 8 metal, group 10 metal, group 11 metal and group 12 metal. The metal may be selected from the group consisting of titanium, iron, platinum, copper, silver, gold, zinc and any mixture thereof.

The metal oxide may be a transition metal oxide. The metal oxide may be selected from the group consisting of group 4 metal oxide, group 8 metal oxide and group 12 metal oxide. The metal oxide may be selected from the group consisting of iron oxide, titanium oxide, zinc oxide and any mixture thereof.

The conditions to induce silanation of the nanoparticle may comprises the use of a base. The base may be an organic base or an inorganic base. The base may be soluble in a substantially aqueous phase. The base may be selected from the group consisting of ammonia, ammonium hydroxide, sodium carbonate, sodium hydroxide, cesium carbonate, cesium hydroxide, potassium carbonate and potassium hydroxide. The base may be an organic base. The organic base may be selected from the group consisting of trimethylamine, triethylamine, butylamine and diisopropylethylamine. The base may be ammonia.

The reaction may proceed at a pH of greater than about 7, about 7.5, about 8, about 8.5, about 9, about 9.5, about 10, about 10.5, about 11, about 11.5 or about 12 The reaction is preferably performed at a pH of less than 12, as at pH values higher than this, the silica shells that are formed may be etched away.

The reaction may be performed at room temperature. The reaction may be performed at a temperature in the range of about 22° C. to about 28° C., about 22° C. to about 24° C., about 22° C. to about 26° C., about 24° C. to about 26° C., about 24° C. to about 28° C. or about 26° C. to about 28.

The method according to any of the preceding claims, wherein the reaction is performed for a duration of about 2 hours to about 4 hours, about 2 hours to about 3 hours or about 3 hours to about 4 hours.

The method according to any of the preceding claims, comprising the step of purifying the $SiO_2$-coated nanoparticle. The purification step may comprise a centrifugation step. The purification step may comprise washing of the silica-coated NPs with deionized water via redispersion centrifugation.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 1 is a schematic illustration showing the synthetic step for coating $SiO_2$ on metal NPs and metal oxide NPs in aqueous medium.

FIG. 2 is a TEM image of $SiO_2$-coated Ag NPs. Scale bar represents 100 nm.

FIG. 3 is a TEM image of $SiO_2$-coated Pt NPs. Scale bar represents 100 nm.

FIG. 4 is a TEM image of $SiO_2$-coated Au NPs. Scale bar represents 100 nm.

FIG. 5 is a TEM image of $SiO_2$-coated ZnO NPs. Scale bar represents 100 nm. The inset shows a magnified view of the $SiO_2$-coated ZnO NPs with a scale bar of 20 nm.

FIG. 6 is a TEM image of $SiO_2$-coated $TiO_2$ NPs. Scale bar represents 100 nm.

FIG. 7 is a graph showing the EDX spectra of (a) coreless $SiO_2$ NPs and (b) $SiO_2$-coated Ag NPs. The insets are corresponding TEM images.

FIG. 8 is a graph showing the EDX spectrum of $SiO_2$-coated ZNO NPs. The inset is its corresponding TEM images.

FIG. 9 is a graph showing the FTIR spectra of ZnO NPs before and after $SiO_2$ coating. The siloxane bond is clearly observed after $SiO_2$ coating.

FIG. 10 refers to $^{29}Si$ NMR spectra of (a) MPTMS monomer, (b) hydrolyzed MPTMS monomer, (c) $SiO_2$ formed after 1 hour of reaction time, and (d) $SiO_2$ formed after 3 hours of reaction time.

EXAMPLES

Non-limiting examples of the invention and a comparative example will be further described in greater detail by reference to specific Examples, which should not be construed as in any way limiting the scope of the invention.

Example 1

Synthetic Procedure

Silver nitrate ($AgNO_3$, ≥99.5%), tetrachloroauric acid trihydrate ($HAuCl_4 \cdot 3H_2O$, ≥99.9%), hexachloroplatinic acid hexahydrate ($H_2PtCl_6 \cdot 6H_2O$, ≥37.5%), 3-(mercaptopropyl)trimethoxysilane (MPTMS, 95%), and sodium citrate dihydrate (≥99%) were used as received from Sigma-Aldrich Ammonia solution (30 wt %) and absolute ethanol (99%) were also used as received from Mallinckrodt and Honeywell, respectively. Deionized water was used throughout all experiments.

Metal NPs and Metal Oxide Nanoparticles

Ag, Pt and Au NPs were selected to represent metal NPs and ZnO and $TiO_2$ NPs were selected to represent metal oxide NPs.

Preparation of 50 nm Ag NPs

Typically, an aqueous solution of sodium citrate (10 mL, 40 mM) was added dropwise into a boiling aqueous solution of silver nitrate (490 mL, 1 mM) in a period of 2 min under vigorous stirring. After boiling for 1 h, the reaction solution was allowed to cool to room temperature followed by centrifugation at 500 rpm for 1 h to remove larger Ag NPs. After collecting by centrifugation, 50 nm Ag NPs were redispersed in 500 mL of deionized water for further use. The particle concentration of 50 nm Ag NPs in solution was $6.6 \times 10^{10}$ particles per mL, based on the ICP-AES measurement.

Preparation of 50 nm Au NPs

A sodium citrate aqueous solution (5 mL, 40 mM) was quickly added into a boiling tetrachloroauric acid aqueous solution of (50 mL, 1 mM) under vigorous stirring. After boiling for 15 min, 15 nm Au NPs were produced and the reaction system was allowed to cool to room temperature. For the seeded growth to produce 50 nm Au NPs, a tetrachloroauric acid aqueous solution (125 mL, 0.3 mM) was heated to boiling, followed by injecting 1.125 mL of the as-prepared seed solution and 0.56 mL of the sodium citrate aqueous solution (40 mM) under vigorous stirring. After boiling for 30 min, an additional 5 mL of the sodium citrate aqueous solution (40 mM) was added, and the mixture was further refluxed for 1 h to stabilize the resulting 50 nm Au NPs. After collecting by centrifugation, 50 nm Au NPs were redispersed in 130 mL of deionized water for further use. The particle concentration of 50 nm Au NPs in solution was $6.4 \times 10^{10}$ particles per mL, based on the ICP-AES measurement.

Preparation of 50 nm Pt NPs

A sodium citrate aqueous solution (5 mL, 40 mM) was quickly added into a boiling hexachloroplatinic acid aqueous solution of (50 mL, 1 mM) under vigorous stirring. After boiling for 1 h, 3 nm Pt NPs were produced and the reaction system was allowed to cool to room temperature. For the seeded growth to produce 50 nm Pt NPs, a hexachloroplatinic acid aqueous solution (125 mL, 0.3 mM) was heated to boiling, followed by injecting 1.1 mL of the as-prepared seed solution and 0.5 mL of the sodium citrate aqueous solution (40 mM) under vigorous stirring. After boiling for 4 h, an additional 0.5 mL of the sodium citrate aqueous solution (40 mM) was added, and the mixture was further refluxed for 2 h to stabilize the resulting 50 nm Pt NPs. After collecting by centrifugation, 50 nm Pt NPs were redispersed in 10 mL of deionized water for further use. The particle concentration of 50 nm Pt NPs in solution was $3.0 \times 10^{10}$ particles per mL, based on the ICP-AES measurement.

The ZnO and TiO$_2$ nanoparticles were used as-received from Sigma-Aldrich.

General Synthetic Procedure

Preparation of Ag@SiO$_2$ NPs as an Example:

Experimentally, 100 µL of MPTMS was added in 30 mL of deionized water, and the turbid mixed solution was shaken at 300 rpm for 1 h until a transparent solution was obtained at room temperature. Then, 3 mL of the pre-hydrolyzed MPTMS aqueous solution was mixed with 2 mL of the as-prepared stock solution of colloidal Ag NPs to form a clear solution (pH=5.5) followed by adding 20 µL of ammonia solution (30 wt %) to form a basic solution (0.12 wt % ammonia concentration, pH=10.2) for silica coating. The mixture was continuously shaken at 300 rpm for different times (from 1 to 5 h) for silica coating, followed by centrifugation at 3000 rpm for 10 min to collect Ag@SiO$_2$ NPs. The collected Ag@SiO$_2$ NPs were purified by washing with deionized water via redispersion-centrifugation for three rounds. The obtained Ag@SiO$_2$ NPs were redispersed in 2 mL of deionized water for further use. Following the same procedure, Au@SiO$_2$ and Pt@SiO$_2$ NPs were also prepared, purified and redispersed in 2 mL of deionized water.

The SiO$_2$-coated metal NPs and metal oxide NPs are prepared by the aqueous-phase procedure as shown in FIG. 1. Initially, the metal and/or metal oxide NPs are dispersed in deionized water with mechanical stirring, followed by the addition of an aqueous solution of pre-hydrolyzed 3-(mercaptopropyl)trimethoxysilane (MPTMS). Pre-hydrolyzed MPTMS is prepared by dissolving MPTMS in deionized water under continuous shaking until a transparent solution is obtained. The mixture is continuously stirred at room temperature, and the pH of the mixture is measured to be approximately pH 5.5. Subsequently, an aqueous ammonia solution (30 wt %) is added to the mixture to initiate the SiO$_2$ formation. The final ammonia concentration is approximately 0.1 to 0.2 wt %. At this point, the pH of the mixture is measured to be approximately 10. The pH of the mixture is adjusted to approximately 10 by adding ammonica. It takes 5 to 10 minutes for the silica coating to start, with a thin layer of silica forming quickly, and the reaction is stirred for 3 hours to obtain a complete, thick SiO$_2$ coating around the metal and/or metal oxide NPs. The process is carried out in one-pot and at room temperature. The resulting SiO$_2$-coated metal NPs and metal oxide NPs are collected by centrifugation and purified by washing with deionized water via redispersion centrifugation. The obtained SiO$_2$-coated metal NPs and metal oxide NPs are redispersed and stored in deionized water for further use.

Example 2

Characterization of the NPs

Transmission Electron Microscopy (TEM) Images

Transmission electron microscopy (TEM) images of the SiO$_2$-coated Ag, Pt and Au NPs are shown in FIGS. 2, 3 and 4 respectively. FIG. 2 shows SiO$_2$ coated Ag NPs having an Ag particle size of approximately 50 nm and a SiO$_2$ layer thickness of approximately 30 to 40 nm. FIG. 3 shows SiO$_2$ coated Pt NPs having a Pt particle sized of approximately 50 nm and a SiO$_2$ layer thickness of approximately 10 to 15 nm. FIG. 4 shows SiO$_2$-coated Au NPs having an Au particle size of approximately 50 nm and a SiO$_2$ layer thickness of 50 to 70 nm.

TEM images of SiO$_2$-coated ZnO and TiO$_2$ NPs are shown in FIGS. 5 and 6 respectively. FIG. 5 shows SiO$_2$-coated ZnO NPs having a particle size of approximately 100 to 150 nm and a SiO$_2$ layer thickness of approximately 5 to 10 nm. FIG. 6 shows SiO$_2$-coated TiO$_2$ NPs having a TiO$_2$ particle size of approximately 150 to 200 nm and a SiO$_2$ layer thickness of approximately 10 to 15 nm.

All the TEM images show successful SiO$_2$ coating, as observed from the uniform SiO$_2$ layer around the entire NP. The images indicate effective and direct SiO$_2$ coating on the surfaces of metal NPs and metal oxide NPs without any requirement of surface pre-treatment or modification.

Energy Dispersive X-ray (EDX) Analysis

The energy dispersive X-ray (EDX) analysis is used to investigate the major chemical elements of the SiO$_2$ coated NPs. THE EDX spectrum of the SiO$_2$ coated Ag NPs (FIG. 7) reveals the presence of oxygen, silicon and sulfur elements by peaks at 0.53, 1.74 and 2.3 keV, respectively, as the key constituents of the coated thiol-functionalized SiO$_2$ shell. These peaks are present in both the coreless SiO$_2$ NPs as well as the SiO$_2$-coated Ag NPs. The presence of the Ag core for the SiO$_2$ coated Ag NPs is confirmed by additional Ag-L peaks for $L_\alpha$, $L_\beta$ and $L_{\beta2}$ at 2.98, 3.15 and 3.34 keV, respectively. It should be noted that the carbon peaks appear in both spectra due to the scattering caused by carbon tape used to mount the samples on the holder. In the same manner, the EDX spectrum of the SiO$_2$-coated ZnO NPs (FIG. 8) confirms the existence of all the key constituents of both ZnO core and coated SiO$_2$ shell. Again, the carbon peak in the spectrum appears due to the scattering caused by carbon tape used to mount the sample on a holder.

Fourier Transform Infrared (FTIR) Spectroscopy

Fourier transform infrared (FTIR) spectroscopy is further used to reveal the existence of the SiO$_2$ shell formed. The FTIR spectrum of the SiO2-coated ZnO NPs (FIG. 9) clearly reveals the presence of a dominant peak corresponding to the siloxane bond (Si—O—Si) indicating the successful coating on the surface of the NPs.

Example 3

Investigation of the Mechanism

The mechanism of $SiO_2$ coating on the surface of NPs in aqueous solution using MPTMS as the $SiO_2$ precursor is investigated by using $^{29}Si$ nuclear magnetic resonance (NMR) spectroscopy. The $^{29}Si$ NMR spectra of MPTMS monomer, hydrolyzed MPTMS monomer and $SiO_2$ formed are compared in FIG. 10. The $SiO_2$ coating mechanism is described in combination with the $^{29}Si$ NMR results. $T_{in}$ represents the number of connectivity (n) of silicon atoms to form a siloxane bond (Si—O—Si).

Hydrolysis

Initially, an oil-in-water emulsion is formed when MPTMS monomer (FIG. 10a) is added to water, and the solution appears turbid due to MPTMS droplets. After shaking for about 1 to 2 hours at room temperature, the droplets gradually disappear, this being accompanied with the disappearance of turbidity. This occurs due to the hydrolysis of the three methoxy (—$OCH_3$) groups in the MPTMS molecule ($HS(CH_2)_3Si(OCH_3)_3$) to hydroxyl (—OH) groups, resulting in the formation of the hydrolyzed MPTMS monomer (represented as the $T_0$ species in FIG. 10b). The hydrolysis of MPTMS is experimentally revealed by the shift of the $^{29}Si$ NMR peak from −42.50 ppm for the non-hydrolyzed MPTMS monomer (FIG. 10a) to −40.26 ppm for the hydrolyzed MPTMS monomer (FIG. 10b).

Condensation and Cross-Linking

The thiol tail group (—SH) of the hydrolyzed MPTMS monomer can form strong chemical bonds with the surface of the metal and/or metal oxide NPs through chemisorption. The —SH groups are bound to the metal NPs and metal oxide surfaces whereas the silanol groups (Si—OH) are arranged outward from the surface for further condensation with the other hydrolyzed MPTMS monomer molecules. After the surface chemisorption of the hydrolyzed MPTMS monomer, condensation of silanol groups (Si—OH+Si—OH→Si—O—Si+$H_2O$) takes place by the addition of ammonia as a cross-linking catalyst for siloxane bond (Si—O—Si) formation to produce dimers, represented as the $T_1$ species in FIG. 10c. The further condensation of monomers and dimers forms short-chain and then long-chain polymers ($T_2$ and $T_3$ species in FIG. 10d) on the surface of the metal NPs and metal oxide NPs. The successive cross-linking of long-chain polymers yields an $SiO_2$ shell around the metal NPs and metal oxide NPs. In the meantime, residual thiol groups are grafted on the $SiO_2$ surface, resulting in a thiol-functionalized NP core-$SiO_2$ shell structure. The condensation and cross-linking of the hydrolyzed MPTMS monomer molecules to form $SiO_2$ on the surface of metal NPs and metal oxide NPs are revealed by the changes of the $^{29}Si$ NMR peaks. At an initial stage of condensation (i.e. after 1 hour of reaction time) shown in FIG. 10c, the peak intensity of the hydrolyzed MPTMS monomer ($T_0$) chemisorbed on the surface of NPs at −40.26 ppm decreases, and a new peak for dimers ($T_1$) at −49.43 ppm is observed. With the increase in the reaction time to 3 hours, the further condensation and cross-linking of monomers and dimers lead to two new peaks at −58.95 ppm for short-chain polymers ($T_2$) and −67.95 ppm for long-chain polymers ($T_3$) as shown in FIG. 10d. The broadness of these two peaks indicates a mixture of polymers with different chain lengths, revealing the extensive formation of $SiO_2$ around the NPs.

INDUSTRIAL APPLICABILITY

The method may be useful in making $SiO_2$-coated metal NPs and metal oxide NPs for use in applications where combined photocatalytic self-cleaning properties and UV-blocking properties are required. The $SiO_2$-coated metal NPs and metal oxide NPs made by the method may be mixed with monomers to form polymer coatings on various surfaces. The $SiO_2$-coated metal NPs and metal oxide NPs made by the method may be useful in coating glass windows, buildings and cars. The $SiO_2$-coated metal NPs and metal oxide NPs made by the method may also be useful in water and air purification applications, as antibacterials, in coatings and paints, in diagnostic materials, sensors, cosmetic and as catalysts.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A method for synthesizing a $SiO_2$-coated nanoparticle, the method comprising steps of:
  reacting a hydroxyl-functionalised silane having the following formula (I)

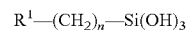

Formula (I)

[Math. 1]

wherein $R^1$ is selected from the group consisting of amino, glycidyl, mercapto and any mixture thereof; and n is an integer from 1 to 10;
  with a nanoparticle in a substantially aqueous phase and subsequently adding an aqueous ammonia solution under conditions to induce silanization of the nanoparticle.

2. The method according to claim 1, wherein the substantially aqueous phase comprises less than 5% (v/v) organic solvent or is substantially free of organic solvent.

3. The method according to claim 1, wherein the substantially aqueous phase is substantially water.

4. The method according to claim 1, wherein $R^1$ is mercapto.

5. The method according to claim 1, wherein n is 3.

6. The method according to claim 1, wherein the hydroxyl-functionalised silane is formed by the hydrolysis of a silane precursor.

7. The method according to claim 6, wherein the hydrolysis is performed by mixing the silane precursor with substantially water to form the hydroxyl-functionalised silane.

8. The method according to claim 6, wherein the silane precursor has the following formula (II):

[Math. 2]

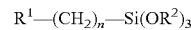

Formula (II)

wherein $R^1$ is selected from the group consisting of amino, glycidyl, mercapto and any mixture thereof;
  $R^2$ is an optionally substituted alkyl group; and
  n is an integer from 0 to 10.

9. The method according to claim 8, wherein $R^1$ is mercapto.

10. The method according to claim 8, wherein $R^2$ is methyl.

11. The method according to claim 8, wherein n is 3.

12. The method according to claim 8, wherein the silane precursor is (3-mercaptopropyl)trimethoxysilane.

13. The method according to claim 1, wherein the nanoparticle is a metal nanoparticle or a metal oxide nanoparticle.

14. The method according to claim 13, wherein the metal is a transition metal.

15. The method according to claim 14, wherein the metal is selected from the group consisting of titanium, iron, platinum, copper, silver, gold, zinc and any mixture thereof or the metal oxide is selected from the group consisting of iron oxide, titanium oxide, zinc oxide and any mixture thereof.

16. The method according to claim 1, wherein the conditions to induce silanization of the nanoparticle comprises the use of a base or ammonia.

17. The method according to claim 1, wherein the reaction proceeds at a pH of greater than 7.

18. The method according to claim 1, wherein the reaction is performed at room temperature.

19. The method according to claim 1, wherein the reaction is performed for a duration of 2 to 4 hours.

20. The method according to claim 1, comprising the step of purifying the $SiO_2$-coated nanoparticle.

\* \* \* \* \*